March 5, 1963

R. C. THOR ETAL 3,080,559

PHASE COMPARISON RADAR RECEIVER MEANS FOR
MEASURING THE ANGLE OF ARRIVAL OF
AN ECHO SIGNAL

Filed June 20, 1960

INVENTORS:
ROBERT C. THOR,
ROBERT S. WEBB,

BY Dudley J. Ready
THEIR AGENT.

March 5, 1963

R. C. THOR ETAL 3,080,559

PHASE COMPARISON RADAR RECEIVER MEANS FOR
MEASURING THE ANGLE OF ARRIVAL OF
AN ECHO SIGNAL

Filed June 20, 1960

INVENTORS:
ROBERT C. THOR,
ROBERT S. WEBB,

BY *Dudley J. Ready*
THEIR AGENT.

March 5, 1963

R. C. THOR ETAL 3,080,559

PHASE COMPARISON RADAR RECEIVER MEANS FOR
MEASURING THE ANGLE OF ARRIVAL OF
AN ECHO SIGNAL

Filed June 20, 1960

INVENTOR:
ROBERT C. THOR,
ROBERT S. WEBB,

BY Dudley T. Ready
THEIR AGENT.

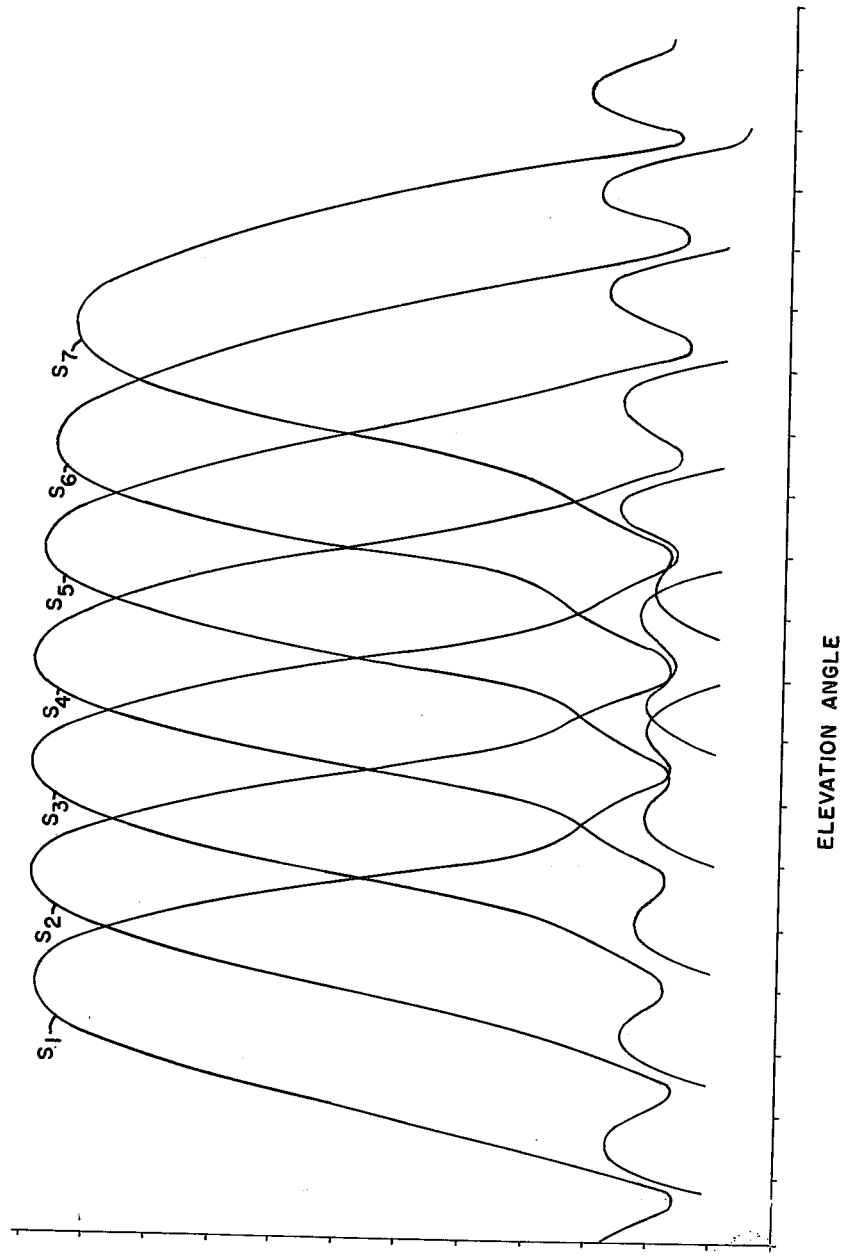

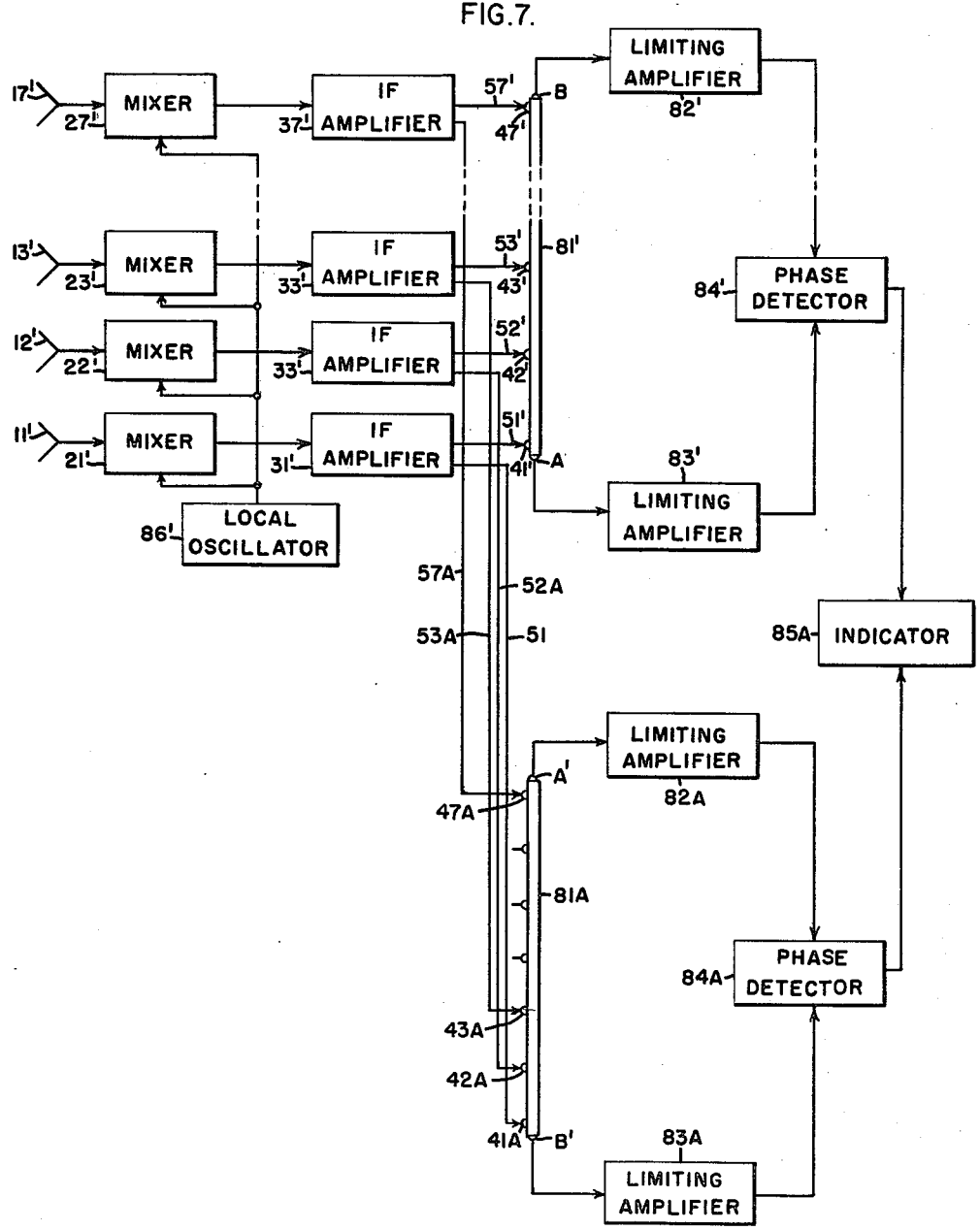

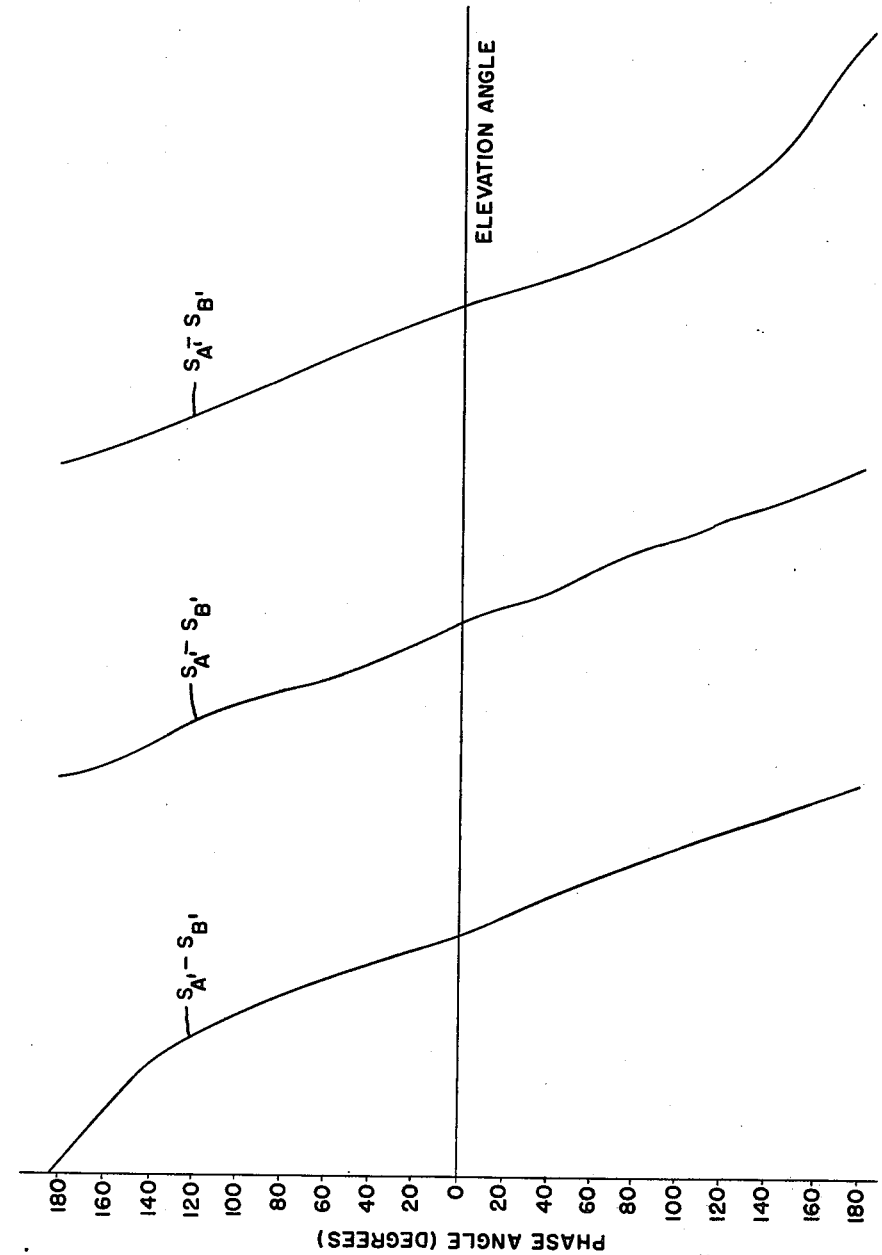

United States Patent Office 3,080,559
Patented Mar. 5, 1963

3,080,559
PHASE COMPARISON RADAR RECEIVER MEANS FOR MEASURING THE ANGLE OF ARRIVAL OF AN ECHO SIGNAL
Robert C. Thor, Liverpool, and Robert S. Webb, North Syracuse, N.Y., assignors to General Electric Company, a corporation of New York
Filed June 20, 1960, Ser. No. 37,231
9 Claims. (Cl. 343—119)

The present invention relates to radar receiver apparatus for sensing the angle of arrival of an echo signal and to apparatus having greater immunity to interfering signals.

Radar search systems of the conventional type measure the position of an object relative to the receiver station in spherical coordinates. A revolving antenna and stacked array of feed elements produce a revolving vertical beam with the desired radiation pattern. From a reflection time measurement and a measurement of the orientation angle of the antenna when an echo signal is received, range and azimuth of the object can be determined. The elevation can be determined by the relative amplitudes of the received signals at the individual feed elements. The invention provides a novel phase comparison radar receiver apparatus to produce compositions of the echo signals received at the individual feed elements and by a phase measurement thereof obtains the elevation angle of the object which produced the echo signals.

The development of radar systems has produced apparatus which is capable of accurately measuring electronically the range of an object which reflects radar pulses. The accurate measurement of the angular coordinates of an object remains difficult. Various arrangements have been proposed such as the radio interferometer and lobe comparison systems to measure electronically the angle of arrival such as the elevation of azimuth angle. A survey description of these prior art systems and others can be found in Introduction to Monopulse, by D. R. Rhodes, McGraw-Hill, 1959. The amplitude comparison systems are sensitive to interfering signals since variations in signal amplitudes produce variations in the measured angle.

An object of the present invention is to provide a novel radar receiver wherein one of the measured angular coordinates is determined by a phase comparison arrangement for determining the relative amplitudes of the echo pulses received at individual feed elements.

A further object of the present invention is a phase comparison system for the extraction of coordinate data from stacked beam radar.

In accordance with one aspect of the disclosed invention, a single "common phase line" is utilized to obtain a phase relationship from the signals received on an array of antenna feed elements. A plurality of receiving channels are provided, each channel being adapted to receive radio signals from one of several overlapping sectors in space. The outputs of each of the channels are connected to a common phase line at junctions which are spaced by a fixed phase angle. The arrangement is made in such a manner that the signals received from the receiving channels are transmitted along the phase line in both directions. The signals are vectorially added in the phase line and produce at one end terminal signals which are displaced by a phase angle indicative of elevation with respect to signals at the other end terminal. This phase displacement is measured by a phase detector to which the two signals are connected after passing through a pair of limiting amplifiers.

The invention will be better understood from the following description taken in connection with the accompanying drawings and its scope will be pointed out in the appended claims.

FIGURE 2 is a schematic diagram of one of the limiting amplifiers in FIGURE 1.

FIGURE 5 is a graph of the energy incident upon each feed element as a function of the target elevation angle from a typical antenna system.

FIGURE 7 is a block diagram of a second embodiment of the invention utilizing a pair of common phase lines to provide coarse and fine data.

FIGURE 8 is a graph of relative phase displacement of the signals appearing at the end terminals of the fine phase line in the embodiment of FIGURE 7 as a function of object elevation angle.

Figure 1:
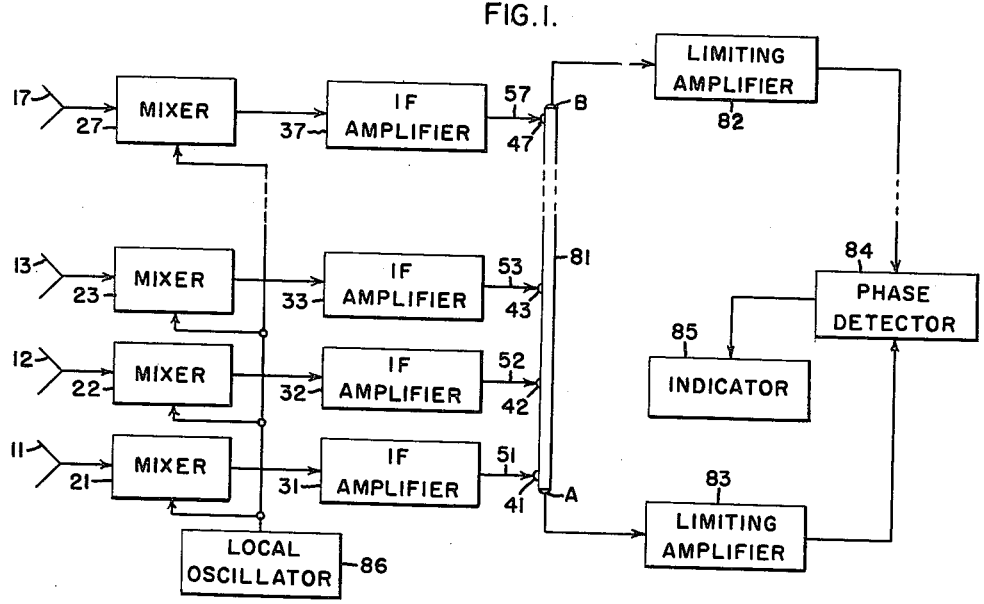
FIGURE 1 is a block diagram of a radar receiver constructed in accordance with the disclosed invention.

FIGURE 1 is a block diagram of a preferred embodiment of a radar receiver in accordance with the invention. A plurality of horns serving as antenna feed elements on the order of 10 in number, are stacked vertically to cover a desired sector of elevation. The bottom three and the top one are represented at 11, 12, 13 and 17, respectively. For search radar, these horns are provided with a reflector and are mounted upon a common support for rotation to search in azimuth. The array would typically cover a 20° to 30° sector above the horizon. For each horn, a receiving channel is provided for mixing, amplifying, etc. the received echo pulse. Since each channel is identical, only the receiving channels for horns 11, 12, 13 and 17 are shown in FIGURE 1. These horns are connected to mixers 21, 22, 23 and 27, respectively, and each mixer is also connected to a common local oscillator 86 which beats the incoming echo pulses at the radar RF frequency to an IF frequency. This arrangement insures that the relative phase relations of the signals at the horns are not disturbed in the IF channels by separate mixing. The outputs of the mixers are applied to suitable IF amplifiers 31, 32, 33 and 37. The outputs of the IF amplifiers are applied to a common phase line 81 at junctions 41, 42, 43 and 47. These junctions are spaced to provide a desired phase displacement in a manner to be more fully described below. The arrangement is such that the standard coaxial lines 51, 52, 53 and 57 from the corresponding IF amplifiers will supply their respective signals to the common phase line 81 in such a manner that a pair of signals are produced at the end terminals A and B of the phase line which are relatively displaced in phase as a function of the elevation angle. Each of the terminals A and B is connected to one of the limiting amplifiers 82 and 83, respectively. The outputs of the limiting amplifiers are applied to a phase detector 84 which produces an output indicative of the phase difference between the applied signals and supplies the same to a suitably calibrated indicator 85.

Examples of suitable conventional components applicable to the system and a description of their principles of operation are well known. The antenna and plural feed elements disclosed in FIGURES 13–14 and 13–15 of Microwave Antenna Theory and Design, by Silver, Radiation Laboratory Series, volume 12, McGraw-Hill, 1947, when provided with individual feed terminals, produce individual echo signals appropriate for phase comparison elevation measurement. Suitable mixers, although old in design, are disclosed in Techniques of Microwave Measurement, by Montgomery, Radiation Laboratory Series, volume 11, McGraw-Hill, 1947 (FIGURES 1.4 and 1.5), Microwave Receivers, by Van Voorhis, Radiation Laboratory Series, volume 23, McGraw-Hill, 1947 (FIGURE 2.8). Klystrons of the type appearing at page 33 of Microwave Measurements, by Gintzton, McGraw-Hill, 1957, are appropriate for the local oscillator. A number of suitable IF amplifiers are illustrated in chapters 4 and 5 of Vacuum Tube Amplifiers, by Valley and Wallman, Radiation Laboratory Series, volume 18, McGraw-Hill, 1947. One should select an amplifier having adequate bandwidth, dynamic range, gain and IF output for the individual application required. The phase detector is also conventional and may be of the extended-range type such as that disclosed in U.S. Patent No. 2,751,555, Extended-Range Phase Comparator, issued June 19, 1956, to G. M. Kirkpatrick.

The limiting amplifiers and common phase line are treated in greater detail below since they are used in an unconventional manner, and in critical applications, require properties not possessed by more conventional devices.

FIGURE 2 is a schematic drawing of a suitable four stage limiting amplifier. The limiters provide a means for applying constant amplitude signals to the phase detector 84 which is (undesirably) amplitude sensitive. In performing this function it is essential that the limiting amplifiers do not introduce phase shifts relative to the zero cross-over which vary with input amplitude. This amplifier is comprised of four substantially identical stages which each incorporate a pair of 6AQ5 tubes in a push-pull amplifier arrangement and a beam deflection tube, 6AR8, as the limiting element. The beam type deflection tube is a limiter characterized by good phase stability. There are two factors that principally contribute to phase instability. First, since the limiting amplifiers considered here are bandpass devices, the coupling networks employ tuned circuits. Such networks result in a phase shift between input and output which changes as the center frequency of the network changes from the intermediate frequency of the pulses. It is therefore necessary that the limiting tubes have negligible changes in capacitance and conductance since these tube parameters form part of the networks themselves, and hence affect tuning of the networks. Second, the stray coupling between input and output must be either eliminated or compensated for.

The 6AR8 tube itself is of the sheet beam type. A constant current beam is formed by the action of electrodes 3, 5 and 6 which direct the electrons from cathode 7 between deflection plates at 1 and 2 and produces equal currents in the anodes 8 and 9. The input signal is applied in push-pull to the deflection plates and directs the beam to one or the other of the anode plates 8 and 9. A change in anode current distribution proportional to voltage between deflectors results at small signal voltages. For these conditions the tube operates as an amplifier, but as the input signal amplitude is increased, a point is reached where the beam is entirely switched to one anode. At this point the current at the selected anode is a maximum, and further increases in input signal amplitude will not affect the output current. The tube is then in a limiting region.

The four stages 310, 320, 330 and 340 of the FIGURE 2 limiting amplifier are preceded by the input network including a 6AH6 tube 210. This network provides a matching load to the phase line 81 which is equal to the characteristic impedance, typically 50 ohms, and drives the succeeding pair of push-pull amplifier tubes. The input signal is applied across the matching resistance 119 to the control grid 201 through coupling capacitor 211 from the input terminal 208. The input ground terminal 209 and the suppressor grid 202 of pentode 210 through line 213 are connected to common ground. A grid leak resistor 212 is connected from the control grid to ground.

The screen grid 206 is connected to the screen bias bus 306. Cathode resistor 214 and parallel capacitor 215 couple cathode 207 to ground for signal voltages. The plate 205 is connected to one terminal of a center tapped inductance, 241, having the center tap thereof connected to plate supply bus 304, is bypassed to ground through capacitor 245. The inductance 241 serves as the load for the input tube 210. In the input network, as in each stage of the limiting amplifier, it is essential that stray coupling between stages be avoided since coupling introduces a phase shift. Capacitors such as capacitor 245 shunt induced IF signals to ground.

The first limited stage, identical with the three subsequent stages, is comprised of two 6AQ5 pentode tubes 220 and 230 for amplication and the 6AR8 tube 10 for limiting. The ends of the center tapped inductor 241 are each connected to one of the control grids 221 and 231 through coupling capacitors 242 and 243, respectively. The inductor 241 and the capacitances of the tubes 220, 230 and 210 provide the principal capacitive contributions of a parallel resonant circuit tuned to the IF frequency. A pair of matched resistors 246 and 247 are connected in series between the control grids 221 and 231. A pair of voltage divider resistors 250 and 251 are connected in parallel across a control bias bus 305 of negative polarity and ground. The divider junction is connected to the junction of resistors 246 and 247 for establishment of the desired grid bias to tubes 220 and 230, the cathodes 222 and 232 thereof, being grounded. A bypass capacitor 249 is shunted from the divider junction to ground. Screen grids 226 and 236 are connected to screen bias bus 306. The suppressor grids 227 and 237 of tubes 220 and 230, respectively, are connected internally as illustrated, to their cathodes.

The plates 225 and 235 of the 6AQ5 tubes 220 and 230 are connected in push-pull relation to drive the deflector plates 1 and 2 of the 6AR8 tube 10. The 6AQ5 load circuit is comprised of a tuned network which includes a center tapped inductor 261, the ends of which are connected across the plates 225 and 235 and to the deflectors 2 and 1 through coupling capacitors 262 and 263, respectively. The center tap is connected to the plate supply bus 304 and bypassed to ground through capacitor 265. A pair of matched resistors 266 and 267 are connected in series between the deflector plates 1 and 2. The junction of resistors 266 and 267 is connected to ground. The cathode element 7 of the 6AR8 is connected to control bias bus 305 through resistor 271 and is bypassed to ground through capacitor 275. Electrodes 5 and 6 are connected to ground, and electrode 3 is connected to a voltage divider comprised of resistors 277 and 278 connected between bias line 306 and ground. A bypass capacitor 274 is connected in parallel with resistor 277. The plates 8 and 9 of the tube 10 are connected to a center tapped inductor 281, furnishing the load impedance thereto. The center tap thereof is bypassed to ground by capacitor 285. Coupling to the following limiter stage is derived from the end terminals of inductor 281. The plates 8 and 9 are also connected to the deflectors 1 and 2 through neutralizing capacitors 297 and 298 which are adjustable to compensate for the inherent input-to-output capacitance of the 6AR8 tube.

The second, third and fourth stages 320, 330 and 340, respectively, are identical with the first stage 310 of the limiting amplifier except for the output network of the last stage. The output terminals 308 and 309 are coupled to the load inductor 301 of the last stage by a secondary winding 307. The buses are connected as follows: 305 to −150 volts, 306 to +150 volts, and 304 to +250 volts.

The four stage limiting amplifiers 82 and 83 just described supply constant amplitude signals to the phase detector 84. The stabilization of the amplitude of the input signals supplied to the phase detector greatly increases its accuracy, since its output is at least partially affected by the relative amplitudes of the input signals.

The presence of strong limiting in the limiting amplifiers tends to make the system less sensitive to noise problems and interference.

Prior to a more detailed analysis of the invention, it may be noted that the individual channels are each coupled to separate horns, each scanning an angular segment in space. These angular segments overlap so that a single target in space will provide measurable signal returns in several receiving channels. The amplitude of the signal returns will be greatest in the horns more nearly directed to the target, while those horns directed away from the target will have little or no signal return. The present invention thus provides a novel manner of making an amplitude comparison between the signal returns, so as to localize the exact target position, and does the same, by a phase comparison method in a manner to be described in greater detail below. The conversion from amplitude to phase information is obtained by combining the signals received from the individual feed means in the common phase line $81$ with a fixed phase displacement. The individual signals when combined produce a vector sum which will have a phase displacement which is a function of the relative amplitudes of the individual signals and thus the target position.

Figure 3:
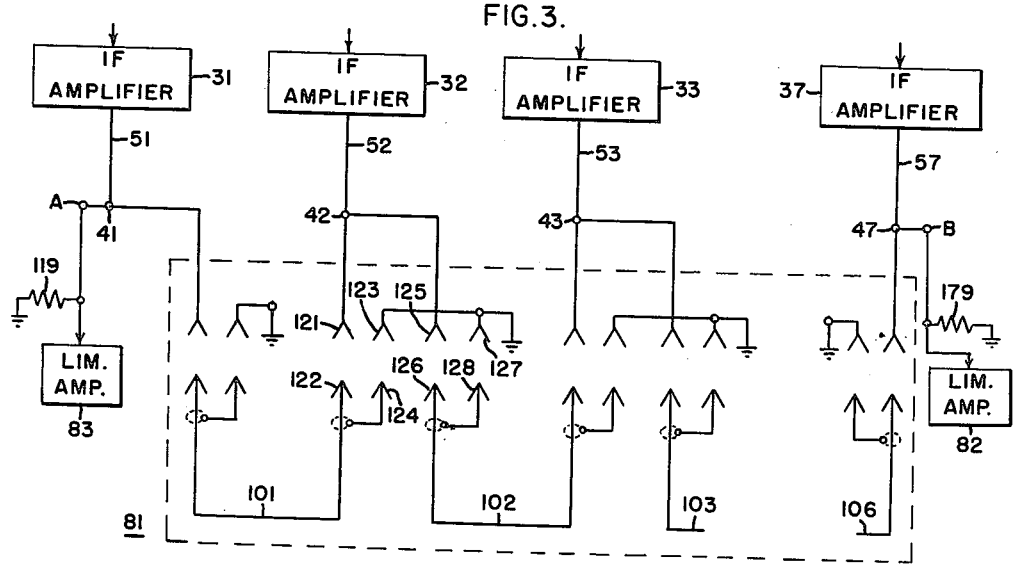
FIGURE 3 is a schematic diagram of the common phase line portion of FIGURE 1.

FIGURE 3 is a schematic diagram of a preferred transmission line to be used for the phase line shown at $81$ in FIGURE 1. The junctions $41$, $42$, $43$ to $47$ are are designed to introduce the signals from the amplifiers $31$, $32$, $33$ to $37$ to phase line $81$ with negligible reflection of the signal and equal transmission toward the terminals A and B. The transmission line is the means in which the several signals from the respective receiving channels are added with the desired mutual phase shift relationships and in which the resulting sum signals are transmitted to the terminals A and B. At typical intermediate frequencies a suitable arrangement utilizes successive lengths of coaxial cable of the standard type RG–58A/U. Where the connecting lines $51$, $52$, $53$ to $57$ from the IF amplifiers are also of the RG–58A/U type, connections may be made by the standard male type connector UG–88U connector and the female type UG–290U connector. For the intermediate junctions from line $52$, $53$ to $56$ the ends of the line will be split and each of the pair of ends will be connected to a transmission line segment. For example, line $52$ is connected to both transmission line segments $101$ and $102$ through connectors $121$, $122$ and $125$, $126$. The outer conductor of the coaxial lines are connected to a common ground through the connectors $123$, $124$ and $127$, $128$. The first and last connecting lines $51$ and $57$, respectively, are connected directly to the transmission lines B and A. Since these connecting lines are only connected to a single segment of the transmission line proper, impedance match is obtained by inserting a resistance $119$ and $179$ between the connecting lines and ground. If desired, a slightly improved matching arrangement may be obtained by also inserting an inductance in series with the resistance. The impedance values for the matching resistances will of course depend upon the coaxial cable used for the transmission line segments. In this embodiment, 50 ohms is proper.

Figure 4:
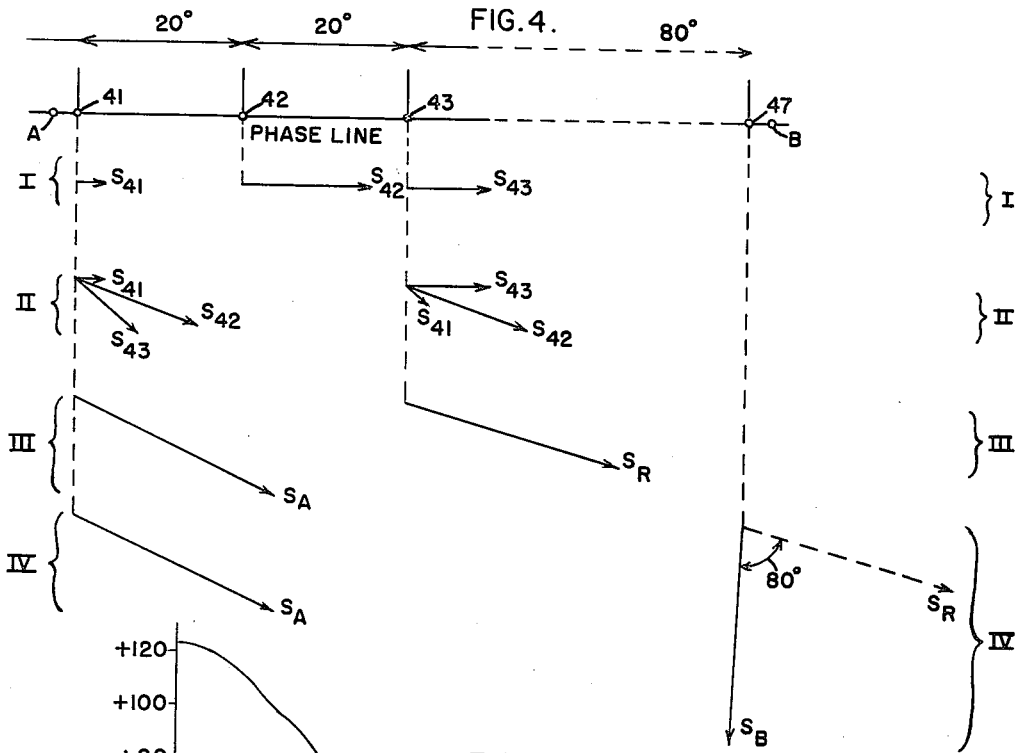
FIGURE 4 is a series of vector diagrams representing the phase relations of echo pulse signals in the common phase line.

In FIGURE 4, the relation between the various signals received from the IF amplifiers for a typical received signal are diagrammed. For a set of signals resulting from a target near the horizon, significant contributions to the output signal will only result from the signals applied from the lower three transmission channels. As shown at line I, signals $S_{41}$, $S_{42}$ and $S_{43}$ of different amplitude are applied to the respective junctions $41$, $42$ and $43$, respectively, in phase. These signals are transmitted both toward terminals A and B with a 20° phase lag in traversing each segment of phase line between adjacent terminals. As shown in line II, this results in the vectorial composition of signals in the transmission line and the particular compositions seen at junctions $41$ and $43$ are diagrammed with the resulting phase displacements. The vectors thus take mutual orientations at 20° intervals, as illustrated. In line III, the resultants of these compositions of signals, $S_A$ at terminal $41$ and $S_R$ at terminal $43$ are diagrammed. In line IV, the resultant signal $S_A$ is repeated as the signal appearing at terminal A with negligible phase shift since the terminal A is adjacent terminal $41$. The signal $S_R$ appearing at terminal $43$ is represented as a dashed arrow in line IV and the same signal, $S_B$, with an 80° phase line lag relative to $S_R$, introduced in traversing from terminal $43$ to terminal $47$, with a solid arrow. Since the resultant signal $S_A$ lags the resultant signal $S_R$ (at terminal $43$) by about 10°, it can be seen that the net effect is that the signals appearing at terminals A and B will be relatively displaced by 70°, that is, the signal $S_B$ will lag the signal $S_A$ by 70°.

FIGURE 5 is a typical graph of a plurality of curves resulting from the plotting of the signal return amplitude as a function of elevation angle for each feed element. This results in a number of overlapping curves, one for each antenna feed element, in which each curve rises from a low-peaked skirt region through the maximum followed by a second low-peaked skirt region. The major peaks of the curves are substantially equal in magnitude. The major peaks are substantially equally spaced and the curves overlap to an extent that there are generally three substantial contributions of signal for a given elevation angle.

Figure 6:
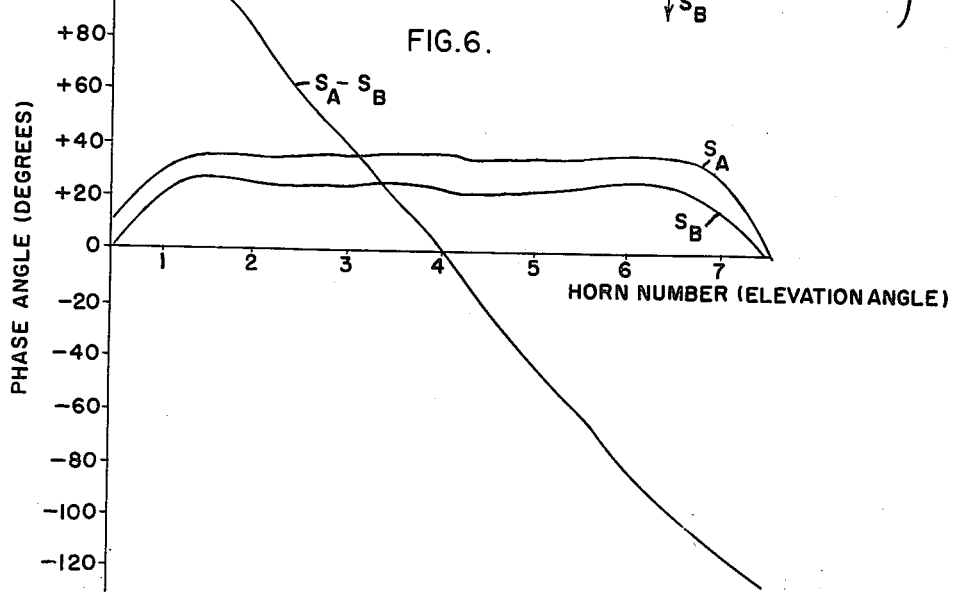
FIGURE 6 is a graph of relative phase displacement of the signals appearing at the phase line terminals A and B as a function of the object elevation angle.

FIGURE 6 is a graph of the phase angle of signals at the phase line terminals A and B as a function of the elevation angle. This curve of $S_A - S_B$ is determined by the particular feed element array which produces the signals illustrated in FIGURE 5 and a common transmission line with a 20° phase displacement between each transmission line junction. In the range between feed element $11$ and feed element $17$ the relation of phase angle to elevation angle is very roughly linear, but most important, there is a unique one to one relation for each point. With proper calibration then, elevation angle can be determined with an accuracy limited primarily by the error in the phase detector. Also illustrated in FIGURE 6 is a plot of the individual amplitudes of the signals appearing at terminals A and B. These signals, $S_A$ and $S_B$, have a substantially constant amplitude over the elevation range. This characteristic is essential to minimize the relative contribution of noise in the output.

The general functional relationship between elevation angle and phase displacement at the end terminals of the phase line may be considered in two parts. The primary factor in shaping the function (for instance, that graphically illustrated in FIGURE 6) is the junction spacing. If a hypothetical antenna array was designed so that there was no overlap between the sectors covered by each feed element, a graph of elevation angle against phase displacement would be a staircase-like function having a single angular value for each feed element. For example, the phase line of FIGURE 3, with seven receiving channels joined at 20° spacings, the resulting graph would have seven equally spaced values of phase displacement ranging from +120° to −120°. Each fixed value of phase displacement would hold for all values of elevation angle within one of the sectors covered by a feed element. To achieve a continuous variation in response throughout the sector under examination, each feed element is arranged to have substantial overlap. Therefore, the graph of elevation angle against phase displacement is continuous. Since any such graph of phase displacement is dependent on the antenna array response, and this response cannot be easily expressed analytically, the function represented by the graph of phase displacement cannot be easily expressed analytically. For this reason, the design of the system must be approached empirically. One consideration is that as large a number of feed elements as is practical should be provided. Because of antenna factors per se, this number has a limitation of approximately 10 for a practical array of stacked horns.

If the spacing of the phase line junctions of FIGURE 3 were made 10° or 30° retaining the same number of channels, the general shape of the graph would be the same, but the spread in phase displacements would be changed from about 240° to about 120° and 360°, respectively. Accordingly, the overall rate of change of phase displacement to elevation angle is directly proportional to the spacing between phase line junctions. For this reason, the resolution of the system can be increased by expanding the segments of the phase line, but when the total phase length of the phase line exceeds 180°, the output signal will correspondingly cover more than 360° and ambiguous readings result.

It can be expected that design variations such as different relative phase displacements between junctions may be advantageous. For example, it is frequently desirable to increase the spacing between pairs of junctions near the end of the phase line. The reason for this is that the received signals from an object near the limits of the sector covered will have contributions from fewer feed elements and a corresponding expansion of the phase line will tend to compensate for this variation in response. A further consideration is that the chosen design should produce equal amplitude signals at the ends of the phase line in order to minimize noise effects.

FIGURE 7 is a block diagram of a second embodiment of the invention wherein two common phase lines are utilized to provide coarse and fine phase comparison. The instrumentation of the coarse phase line is identical in components and connections with the system of FIGURE 1 and the components corresponding to those in FIGURE 1 are assigned to same reference numerals with primes. These components include antenna feed means 11′, etc., mixers 21′, etc., the local oscillator 86′, IF amplifiers 31′, etc., junctions 41′, etc., limiting amplifiers 82′ and 83′ and phase detector 84′. The fine phase comparison section is comprised of a second phase line 81A with the end terminals connected to a second pair of limiting amplifiers 82A and 83A in parallel and the outputs of the amplifiers are both applied to a second phase detector 84A. The components of the fine phase comparison section are identical with the coarse comparison section except that the length of the transmission line segments intermediate the input phase line terminals 41A, 42A, 43A, etc. to 47A are of a length appropriate to provide a larger phase shift between terminals than the phase shift provided in phase line 81′. The phase shift selected and the resulting phase line segment length, is determined by the desired ratio of phase angle to elevation angle. The inputs to the fine phase line 81A are taken from separate isolated outputs of the IF amplifiers 31′, 32′, 33′, etc., in parallel with the corresponding outputs to the coarse phase line 81′ by lines 51A, 52A, 53A, etc., to 57A. The output of the fine phase comparison section taken from the phase detector 84A is combined with output of the coarse phase comparison section in the indicator 85A.

FIGURE 8 is a graph of phase angle against elevation angle in the fine phase detector 84A of FIGURE 7. As in FIGURE 6, this curve is determined by the particular antenna array utilized and the phase displacement between each transmission line junction. The curve resulting from the received signals of FIGURE 5 and a 90° phase displacement between phase line junctions appears as a plurality of substantially straight line segments with the same slope and with discontinuities between them for increasing elevation. Actually, the phase differentials appearing at the phase detector are a continuous function of elevation angle which cyclically passes through values from +180° to −180°. Accordingly, there will be a high ratio of change in phase angle to elevation angle and a corresponding accuracy. Since there will be a plurality of values of elevation angle for a given value of phase angle, the original coarse phase line section is necessary to resolve the ambiguities.

In both the embodiments of FIGURES 1 and 7 the common phase lines are introduced in the circuit after the echo signals are separately mixed and amplified. The vectorial combination of the individual signals can be made before either amplification or mixing dependent upon the signal frequencies. In general, transmission line dimensions become impractically small at the higher signal frequencies, if the indicated phase separations are employed. This consideration generally dictates that the common phase line deal with signals of intermediate frequencies. The amplification or mixing and amplification would then be performed on the output phase signals of the common phase line.

While the fundamental novel features of the invention have been described as applied to preferred embodiments, it is to be understood that the invention is not limited thereto. Other antennas which produce a plurality of signals having an amplitude which is a function of the angle of incidence in the same manner as the signals produced by the disclosed feed means are adaptable to a common phase line comparison receiver to measure the angle of arrival. The true scope of the invention including those variations apparent to one skilled in the art is defined in the following claims.

What is claimed is:

1. A location system employing radio waves comprising: a plurality of directional receiving channels adapted to receive radio signals from consecutive overlapping sectors in space; a phase transmission line having a substantial phase delay between the ends thereof; means consecutively connecting said receiving channels to said phase line at spaced points between said ends, thereby producing a pair of vectorially combined signals at said ends which have a phase displacement that is a function of the spatial position of the origin of said radio signals; and a phase detector connected between said ends to measure the relative phase displacement of said vectorially combined signals.

2. The combination of claim 1 including: limiting means interposed between the ends of said phase line and said phase detector for achieving a substantially constant amplitude to said combined signals.

3. The combination of claim 2 wherein said limiting means is characterized by a phase response substantially independent of input amplitude.

4. The combination of claim 1 wherein each receiving channel includes means to convert the frequency of said radio signal to an intermediate frequency.

5. The combination of claim 1 wherein said spaced points on said phase line are spaced by intervals representing equal phase displacements.

6. The combination of claim 1 wherein the total length of said phase line is less than 180° at the operating frequency.

7. A radar receiving system comprising: a plurality of directional receiving channels adapted to receive radar echo signals from consecutive overlapping sectors in space; a phase transmission line having a substantial phase delay between the ends thereof; means consecutively connecting said receiving channels to said phase line at spaced points between said ends, thereby producing a vectorially combined signal at one of said ends having a phase difference relative to said received echo signal that is a function of the spatial position of the origin of said echo signals; means to provide a reference signal in accordance with the phase displacement of said echo signal; and a phase detector connected between said one end of the phase line and said means to provide a reference signal to measure the phase differential between the signals received by said detector.

8. A location system employing radio waves comprising: an array of directional receiving channels adapted to receive radio signals from consecutive overlapping sectors in space, said receiving channels being provided with antenna means for receiving radio signals from the consecutive overlapping sectors in space arranged such that an object in the central portion of said sectors will provide substantial returns in at least three of said channels; a phase transmission line having a substantial phase delay between the ends thereof; means consecutively connecting said receiving channels to said phase line at spaced points between said ends, thereby producing a pair of vectorially combined signals at said ends which have a phase displacement that is a function of the spatial position of the origin of said radio signals; and a phase detector connected between said ends to measure the relative phase displacement of said vectorially combined signals.

9. A location system employing radio waves comprising: a plurality of directional receiving channels adapted to receive radio signals from consecutive overlapping sectors in space; a phase transmission line having a substantial phase delay between the ends thereof; means consecutively connecting said receiving channels to said phase line at spaced points between said ends, thereby producing a pair of vectorially combined signals at said ends which have a phase displacement that is a function of the spatial position of the origin of said radio signals; a phase detector connected between said ends to measure the relative phase displacement of said vectorially combined signals; a second phase transmission line; second means consecutively connecting said receiving channels to said second phase line in parallel with said first phase line at points between said ends and less closely spaced than in said first phase line, thereby producing a second pair of vectorially combined signals at said ends which have a phase difference that is a fine function of the spatial position of the origin of said echo signals; and a second phase detector connected to the ends of said second phase line.

References Cited in the file of this patent
UNITED STATES PATENTS
2,736,019  Vogeley et al. _____ Feb. 21, 1956